United States Patent
Beyer et al.

(10) Patent No.: US 9,962,732 B2
(45) Date of Patent: May 8, 2018

(54) METHOD FOR COATING THE SURFACE OF INORGANIC PARTICLES WITH SILICON DIOXIDE AND AT LEAST ONE FURTHER INORGANIC COMPOUND

(71) Applicant: Kronos International, Inc., Leverkusen (DE)

(72) Inventors: Norbert Beyer, Frechen (DE); Jud-Reginauld Fidalgo-Estevez, Wuerselen (DE); Heiko Frahm, Leverkusen (DE); Siegfried Bluemel, Ratingen-Eggerscheid (DE)

(73) Assignee: Kronos International, INc., Leverkusen (DE)

( * ) Notice: Subject to any disclaimer, the term of this patent is extended or adjusted under 35 U.S.C. 154(b) by 41 days.

(21) Appl. No.: 14/818,546

(22) Filed: Aug. 5, 2015

(65) Prior Publication Data
US 2016/0045933 A1  Feb. 18, 2016

(30) Foreign Application Priority Data

Aug. 18, 2014 (EP) .................................. 14002863

(51) Int. Cl.
| | |
|---|---|
| B05D 3/04 | (2006.01) |
| B05D 7/00 | (2006.01) |
| C09C 1/36 | (2006.01) |
| C09C 3/06 | (2006.01) |

(52) U.S. Cl.
CPC .......... *B05D 3/0466* (2013.01); *B05D 7/544* (2013.01); *C09C 1/3661* (2013.01); *C09C 3/063* (2013.01); *C01P 2002/85* (2013.01); *C01P 2004/03* (2013.01); *C01P 2004/62* (2013.01); *C01P 2006/60* (2013.01)

(58) Field of Classification Search
CPC ........ B05D 7/544; C09C 1/3661; C09C 3/063
See application file for complete search history.

(56) References Cited

U.S. PATENT DOCUMENTS

| | | | |
|---|---|---|---|
| 3,203,818 A | 8/1965 | Rechmann et al. | |
| 3,650,793 A | 3/1972 | Goodspeed et al. | |
| 2006/0211798 A1* | 9/2006 | Galembeck | C01B 25/36 524/414 |

(Continued)

FOREIGN PATENT DOCUMENTS

| | | |
|---|---|---|
| DE | 1467492 | 11/1968 |
| GB | 969352 | 9/1964 |

(Continued)

OTHER PUBLICATIONS

Database WPI Week 200381 Thomson Scientific, London, GB.

*Primary Examiner* — Duy Vu N Deo
(74) *Attorney, Agent, or Firm* — Locke Lord LLP

(57) ABSTRACT

The invention relates to a method for coating the surface of inorganic particles in an aqueous phase, particularly of titanium dioxide pigment particles, with a dense skin of silicon dioxide and at least one further inorganic compound, particularly with aluminum oxide, where the coating largely consists of separate layers. Titanium dioxide pigment particles, treated with $SiO_2$ and $Al_2O_3$ according to the invention, are characterized by improved tinting strength, reduced acid solubility and an isoelectric point shifted towards higher pH values.

15 Claims, 2 Drawing Sheets

(56) References Cited

U.S. PATENT DOCUMENTS

| | | | | |
|---|---|---|---|---|
| 2011/0041726 A1* | 2/2011 | Robb | ................ | C01G 23/0532 106/31.13 |
| 2013/0028948 A1* | 1/2013 | Yamamoto | ........... | C09D 7/1225 424/401 |

FOREIGN PATENT DOCUMENTS

| | | |
|---|---|---|
| JP | 2003212722 | 7/2003 |
| WO | 2006012950 | 2/2006 |
| WO | WO2006/012950 | 2/2006 |

* cited by examiner

METHOD FOR COATING THE SURFACE OF INORGANIC PARTICLES WITH SILICON DIOXIDE AND AT LEAST ONE FURTHER INORGANIC COMPOUND

RELATED APPLICATIONS

This application claims the benefit of EP Patent App. No. 14002863.0 filed Aug. 18, 2014.

BACKGROUND

Field of the Invention

The invention relates to a method for coating the surface of inorganic particles, particularly of titanium dioxide pigment particles, with a dense skin of silicon dioxide and at least one further inorganic compound, particularly with aluminium oxide.

Technological Background of the Invention

Inorganic particles, particularly inorganic pigment particles, are often surface-treated in order to modify certain properties, such as surface charge, dispersing properties, acid resistance or light-fastness. Because of its high refractive index, titanium dioxide, in particular, is a high-quality pigment that is used in many sectors, e.g. in coatings, plastics, or fibres and paper. However, titanium dioxide is photoactive, meaning that free radicals are formed on the surface via electron-hole pairs as a result of exposure to ultraviolet radiation. These free radicals can enter into reactions with the substances present in the surrounding matrix, this possibly leading to destruction of the matrix.

One customary way of reducing the photoactivity of the titanium dioxide particles, i.e. of increasing their photochemical stability, is to cover the particles with the densest possible amorphous layer of silicon dioxide, a so-called "dense skin", which is intended to prevent the formation of free radicals on the surface. It is, however, likewise known that the dense $SiO_2$ skin impairs the tinting strength (TS), gloss and dispersibility of the pigment particles. For this reason, the pigment particles are customarily treated with aluminium oxide following application of the dense $SiO_2$ skin.

Furthermore, various methods are known from the prior art for further improving surface treatment with a dense silicon dioxide skin and aluminium oxide. For example, DE 1 467 492 A discloses a method for improving both the tinting strength, the gloss and also the photochemical stability of titanium oxide, where the pigment particles are surface-coated twice with $SiO_2$ and $Al_2O_3$ and finally subjected to heat treatment at 700° C.

It is generally assumed that the improvement in the tinting strength, gloss and dispersibility of pigments given a dense $SiO_2$ skin and subsequent $Al_2O_3$ treatment is caused by changed surface properties—zeta potential and/or isoelectric point (IEP). It is generally known that the isoelectric point of aluminium oxide surfaces lies at a pH value of roughly 9, in contrast to silicon dioxide surfaces, whose isoelectric point lies at a pH value of roughly 2. However, surface analyses show that the known methods for sequential precipitation of an inner, dense $SiO_2$ layer and an outer $Al_2O_3$ layer do not produce clearly separate layers. Rather, $Al_2O_3$ is incorporated into the $SiO_2$ layer, such that a mixed layer of $SiO_2$ and $Al_2O_3$ forms. This finding is backed by the results of measurements of the zeta potential and the isoelectric point of the particles. The isoelectric point of pigment surfaces provided with a dense $SiO_2$ skin and subsequently treated with $Al_2O_3$, usually lies at a pH value of well below 9.

There is thus a need for a method with the help of which separate layers of inorganic compounds can be applied to the surface of inorganic particles having a dense $SiO_2$ skin.

BRIEF DESCRIPTION OF THE INVENTION

An object of the invention is to indicate a method with the help of which the surface of inorganic particles can be provided with a dense layer of silicon dioxide and at least one further, separate layer of an inorganic compound. The object is particularly to apply the purest possible, continuous $Al_2O_3$ layer as the final layer to the surface of titanium dioxide pigment particles that have previously been provided with a dense $SiO_2$ skin.

The object is solved by a method for the surface treatment of inorganic particles in an aqueous suspension with a dense silicon dioxide layer and at least one further inorganic compound, characterised in that, following application of the silicon dioxide layer, the particles are separated from the suspension, washed and heat-treated before subsequently being slurried into an aqueous suspension again and coated with at least one further inorganic compound.

Further advantageous embodiments of the invention are described in the sub-claims.

BRIEF DESCRIPTION OF THE DRAWINGS

For a more complete understanding of the present invention and for further advantages thereof, reference is now made to the following description taken in conjunction with the accompanying drawings in which.

DESCRIPTION OF THE PREFERRED EMBODIMENT

Figure 1:
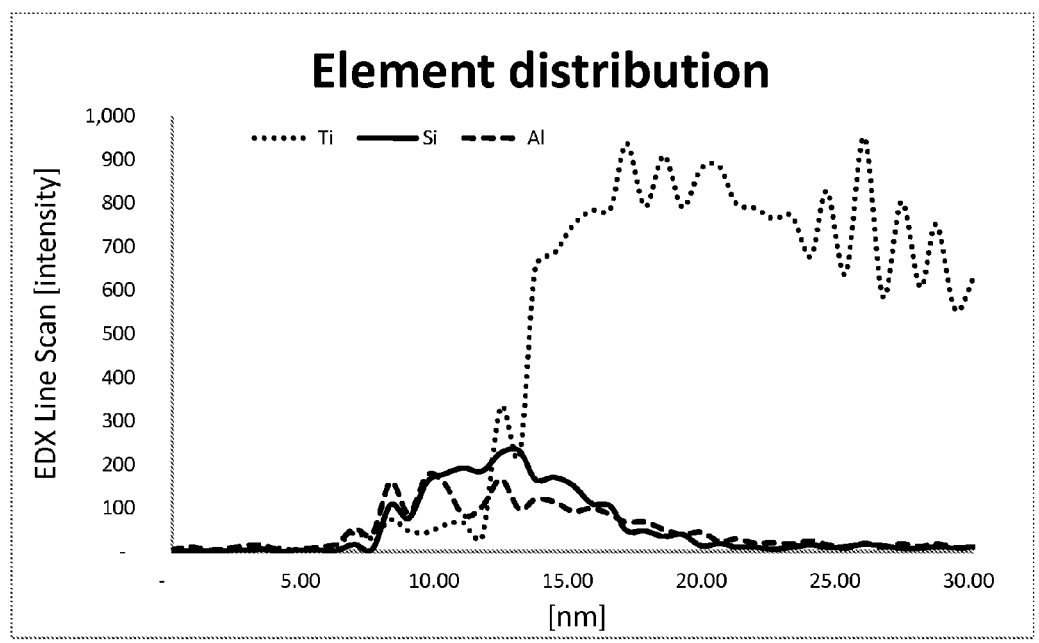
FIG. 1 is an Energy Dispersive X-ray spectroscopy (EDX) line scan of a sample according to the Reference Example, showing the intensity on the ordinate axis and the nanometers on the abscissa axis.

All data disclosed below regarding size in μm, etc., concentration in % by weight or % by volume, pH value, etc. are to be interpreted as also including all values lying in the range of the respective measuring accuracy known to the person skilled in the art. All data disclosed below regarding time, temperature, amount of components, concentration in % by weight, etc. are to be interpreted as also including all values lying in the range of the respective measuring accuracy known to the person skilled in the art. Unless otherwise stated, technical grades of the various materials were used in the preferred embodiments. The term "substantially free" is intended to connote that the particular material is not detected (i.e. is below the detection limit) using standard commercial tests and methodologies used in the industry as of the earliest priority date of this application.

In the context of the invention, silicon dioxide, aluminium oxide and other metal oxides are taken to also mean the respective hydrous forms, e.g. hydroxides, hydrated oxides, etc.

The method according to the invention is based on an aqueous suspension of inorganic particles. The particles are, for example, titanium dioxide, zirconium oxide, iron oxide and others. According to the invention, pigment particles are preferred, particularly titanium dioxide pigment particles.

The titanium dioxide pigment particles are manufactured by customary methods, e.g. the sulphate process or the chloride process. The mean particle size is customarily in the range from 0.2 to 0.5 µm.

The untreated particles are slurried into an aqueous suspension and disagglomerated, preferably in an agitator mill, adding a customary dispersant if appropriate.

To apply a dense silicon dioxide skin, the suspension is customarily set to a pH value in the range from 10 to 12, after which an alkaline silicate solution is added. The pH value is then lowered to below 9 and silicon dioxide precipitated. Corresponding procedures are disclosed in EP 1 771 519 B1, for example. These methods are familiar to the person skilled in the art.

In a special embodiment of the invention, the dense $SiO_2$ skin contains further metal ions, as described in EP 1 771 519 B1 or WO 2007/085493 A2, for example.

According to the invention, the particles are separated from the suspension and washed following precipitation of the dense $SiO_2$ skin onto the particle surface.

The precipitated skin preferably contains 1.5 to 6% by weight $SiO_2$, referred to total particles, particularly 2 to 4% by weight.

The particles are subsequently subjected to heat treatment. The heat treatment preferably takes place at temperatures in excess of 100° C., particularly between 200° C. and 850° C., and more preferably between 400° C. and 800° C. Examples of suitable equipment include customary apparatus, such as a spray drier, drying oven, plate drier, vibrating fluidised-bed drier, muffle furnace or rotary kiln. The duration of the heat treatment varies between a few minutes and several hours as a function of the selected temperature and the equipment.

In a special embodiment of the invention, the particles are heat-treated in two or more stages, e.g. first being dried at temperatures of >100° C. and subsequently heat-treated at higher temperatures.

The pigment particles are preferably first dried in a spray drier and subsequently heat-treated in a plate drier or a muffle furnace.

Subsequently, the particles are again slurried into an aqueous suspension, disagglomerated, and at least one layer of an inorganic compound is applied by adding a corresponding salt solution and precipitating the corresponding compound onto the particle surface by known methods.

The selected inorganic compounds preferably contain aluminium, elements of the second main group or the subgroups, or combinations thereof. The elements from the lanthanide series are suitable, for example.

In particular, the further inorganic compound is selected from the group comprising oxides, hydroxides, carbonates, phosphates and sulfides, or combinations thereof.

In a special embodiment of the invention, aluminium oxide is involved.

Sodium aluminate is used with preference as the metal salt solution for precipitating aluminium oxide. Also suitable are aluminium sulphate, aluminium chloride, etc. 1 to 10% by weight, particularly 2 to 4% by weight, aluminium salt solution is preferably used, calculated as $Al_2O_3$ and referred to the total particles.

Finally, the particles are separated from the suspension, washed, dried and, where appropriate, micronized in the known manner.

EXAMPLES

The invention is described in more detail on the basis of the examples below, although this is not intended to limit the scope of the invention.

Reference Example

An aqueous suspension of titanium dioxide base material (manufactured by the chloride process) with a concentration of 450 g/l was disagglomerated in a sand mill and then set to a pH value of 10 and a concentration of 350 g/l $TiO_2$. A sodium silicate solution with a concentration of 100 g/l $SiO_2$ was subsequently added in a quantity of 2.8% weight, calculated as $SiO_2$ and referred to $TiO_2$ base material, within 20 minutes and while stirring. A solution of titanium oxychloride with a concentration of 140 g/l $TiO_2$ was subsequently added in a quantity of 0.2% by weight, calculated as $TiO_2$ and referred to $TiO_2$ base material, within 60 minutes and while stirring. HCl (concentration: 345 g/l) was subsequently added, within 60 minutes and while stirring, in such a quantity that a pH value of 4 was achieved, during which time an $SiO_2$ layer formed on the particle surface.

Subsequently, sodium aluminate solution with a concentration of 260 g/l $Al_2O_3$ was added in a quantity of 2.3% by weight, calculated as $Al_2O_3$ and referred to $TiO_2$, at the same time as HCl, in which context the pH value constantly remained at roughly 4. Sodium aluminate solution with a concentration of 260 g/l $Al_2O_3$ was subsequently added in a quantity of 0.2% by weight, calculated as $Al_2O_3$ and referred to $TiO_2$, such that a pH value of roughly 5.7 was obtained.

The solids were subsequently separated off by filtration, washed with cold, fully demineralised water for 3 hours, and dried at 160° C. for 16 hours. Finally, the particles were micronized in a steam mill, trimethylolpropane (TMP) being added.

The particles were examined under the scanning electron microscope (SEM), and a 30 nm long EDX line scan was recorded perpendicularly to the particle surface, through the particle nucleus and the particle coating (FIG. 1).

Example 1

Same as the Reference Example, except that the following process steps were performed between coating with $SiO_2$ and coating with $Al_2O_3$:

The solids were separated off by filtration and washed with cold, fully demineralised water for 3 hours. The filter paste produced was spray-dried at a temperature of 160° C.

The spray-dried filter paste was subsequently again slurried into an aqueous suspension with 450 g/l solids and disagglomerated in an agitator mill (PM5 with Ottawa sand 20/30) with a throughput of 10 kg/h, without setting the pH value and without adding dispersant.

The $TiO_2$ suspension was subsequently again diluted to 350 g/l $TiO_2$ and set to a pH value of 4. The procedure then continued with addition of the sodium aluminate solution.

Example 2

Same as Example 1, except that spray-drying was additionally followed by heat treatment at 400° C. for 2 hours.

Example 3

Same as Example 1, except that spray-drying was additionally followed by heat treatment at 800° C. for 1 hour.

Example 4

Same as Example 1, except that spray-drying was additionally followed by heat treatment at 800° C. for 4 hours.

Figure 2:
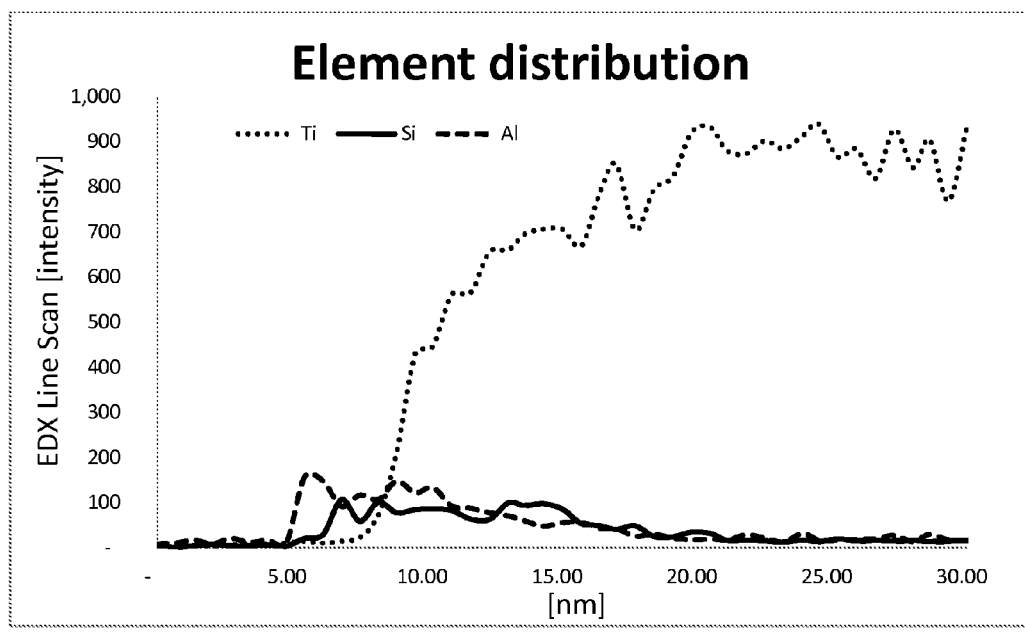
FIG. 2 is an EDX line scan of a sample according to Example 4, showing the intensity on the ordinate axis and the nanometers on the abscissa axis.

The sample from Example 4 was examined under the scanning electron microscope (SEM), and a 30 nm long EDX line scan was recorded perpendicularly to the surface, through the particle nucleus and the particle coating (FIG. 2).

Testing

The pigment samples produced were tested as regards their tinting strength (TS), mean particle size ($d_{50}$), acid solubility and isoelectric point (IEP). The corresponding values are indicated in the Table.

TABLE

| Sample | Treatment | TS | $d_{50}$ | Acid solubility | IEP |
|---|---|---|---|---|---|
| Example 1 | Drying only | 102 | 0.30 μm | 13% by weight | 8.5 |
| Example 2 | 400° C., 2 h | 101 | 0.32 μm | 4% by weight | 8.8 |
| Example 3 | 800° C., 1 h | 103 | 0.31 μm | 3% by weight | 8.7 |
| Example 4 | 800° C., 4 h | 101 | 0.32 μm | 2% by weight | 8.8 |
| Reference Example | — | 98 | 0.33 μm | 13% by weight | 8.1 |

The test results (Table) show that the acid solubility of the pigment treated according to the invention shows a marked decline as the temperature and/or duration of the heat treatment increases. The isoelectric point (IEP) shows a parallel shift towards higher pH values, as a result of which the dispersibility of the particles is improved. At the same time, the heat treatment brings about an improvement in the tinting strength (TS), while maintaining the mean particle size.

It is presumed that the heat treatment largely removes the hydroxyl groups on the surface of the dense $SiO_2$ skin according to the following equation:

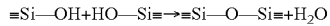

The evaporation of the water during the heat treatment completes the condensation of the surface silanol groups ($\equiv$Si—OH), and the $SiO_2$ skin is compacted. The acid solubility declines. The compaction of the $SiO_2$ skin prior to final precipitation of the aluminium prevents the formation of a mixed layer of $SiO_2$ and $Al_2O_3$. Instead, the particles enclosed in $SiO_2$ are enveloped by a dense, largely continuous layer of $Al_2O_3$. The formation of the continuous $Al_2O_3$ layer shifts the isoelectric point towards higher pH values, thus leading to better dispersibility.

The scanning electron microscope examinations with the EDX line scan clearly show that the conventional procedure leads to an outer mixed layer of $SiO_2$ and $Al_2O_3$ (FIG. 1: Reference Example), while the procedure according to the invention leads to a largely pure outer $Al_2O_3$ layer (FIG. 2: Example 4).

Test Methods

Tinting Strength (TS)

The tinting strength was measured by means of the MAB Test. In this context, the pigment to be tested is incorporated into a black paste according to DIN 53165 on an automatic muller. The pigment volume concentration is 17%. The grey paste produced is applied to a Morest chart, and a Hunter Colorimeter PD-9000 is used to determine the reflectance values of the layer in wet condition. The TS values derived are referred to an internal standard.

Mean Particle Size $d_{50}$

The particle size distribution was measured by laser diffraction (Mastersizer 2000) and used to determine the $d_{50}$ value (median of the mass distribution).

Acid Solubility

A suspension of 500 mg pigment in 25 ml concentrated sulphuric acid (96% by weight) is kept at 175° C. for 60 minutes. Following filtration, the dissolved $TiO_2$ in the filtrate is determined by means of ICP atomic emission spectrometry. The lower the concentration of dissolved $TiO_2$, the more dense the $SiO_2$ skin on the pigment surface.

Isoelectric Point (IEP)

The isoelectric point is determined on titanium dioxide suspensions (concentration 10% by weight) with the help of an ESA probe.

Scanning Electron Microscope Examinations

A LEO 1530 VP with an EDX system from Messrs. Oxford was used

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for coating the surface of inorganic particles in an aqueous suspension with a dense layer of silicon dioxide and at least one further inorganic compound, comprising:
    applying a separate dense silicon dioxide layer to the inorganic particles in an aqueous suspension;
    following application of the silicon dioxide layer, separating the particles from the suspension, washing the particles and heat treating the particles;
    subsequently creating a second aqueous suspension of the particles;
    coating the particles in the second suspension with at least one further separate inorganic compound layer;
    wherein the heat treatment is carried out in two stages with the first stage carried out at a temperature above about 100° C. and the second stage being carried out at a higher temperature from about 200° C. to about 850° C.

2. The method of claim 1 wherein the heat treatment is carried out at a temperature from about 200° C. to about 850° C.

3. The method of claim 1 wherein the heat treatment is carried out at a temperature from about 400° C. to about 800° C.

4. The method of claim 1 wherein the inorganic particles are pigment particles.

5. The method of claim 4 wherein the inorganic particles are titanium dioxide pigment particles.

6. The method of claim 1 wherein the at least one further inorganic compound is a compound of an element selected from the group consisting of aluminum, alkali earth metals, transition metals, lanthanide series, actinide series or combinations thereof.

7. The method of claim 6 wherein the at least one further inorganic compound is a compound of an element selected from the lanthanide series.

8. The method of claim 1 wherein the at least one further inorganic compound is selected from the group consisting of oxides, hydroxides, carbonates, phosphates, sulfides, and combinations thereof.

9. The method of claim 1 wherein the at least one further inorganic compound is aluminum oxide.

10. The method of claim 1 wherein the heat treatment is carried out using a device selected from the group consisting of a spray drier, plate drier, vibrating fluidized-bed drier, muffle furnace, and rotary kiln.

11. A method for coating the surface of titanium dioxide particles in an aqueous suspension with a dense layer of silicon dioxide and at least one further inorganic compound, comprising:
applying a separate dense silicon dioxide layer to the titanium dioxide particles in an aqueous suspension;
following application of the silicon dioxide layer, separating the particles from the suspension, washing the particles and heat treating the particles;
subsequently creating a second aqueous suspension of the particles;
coating the particles in the second suspension with at least one further separate inorganic compound layer;
wherein the heat treatment is carried out in two stages with the first stage carried out at a temperature above about 100° C. and the second stage being carried out at a higher temperature from about 200° C. to about 850° C.

12. The method of claim 11 wherein the heat treatment is carried out at a temperature from about 200° C. to about 850° C.

13. The method of claim 12 wherein the heat treatment is carried out at a temperature from about 400° C. to about 800° C.

14. The method of claim 11 wherein the at least one further inorganic compound is selected from the group consisting of aluminum oxides, hydroxides, carbonates, phosphates, sulfides, and combinations thereof.

15. The method of claim 14 wherein the at least one further inorganic compound is aluminum oxide.

* * * * *